US011599738B2

(12) United States Patent
Schie et al.

(10) Patent No.: US 11,599,738 B2
(45) Date of Patent: Mar. 7, 2023

(54) METHOD FOR EXAMINING DISTRIBUTED OBJECTS BY SEGMENTING AN OVERVIEW IMAGE

(71) Applicant: Leibniz-Institut für Photonische Technologien e.V., Jena (DE)

(72) Inventors: Iwan W. Schie, Jena (DE); Christoph Krafft, Jena (DE); Jürgen Popp, Jena-Kunitz (DE)

(73) Assignee: Leibniz-Institut FÜR Photonische Technologien E.V., Jena (DE)

( * ) Notice: Subject to any disclaimer, the term of this patent is extended or adjusted under 35 U.S.C. 154(b) by 558 days.

(21) Appl. No.: 16/086,270

(22) PCT Filed: Mar. 17, 2017

(86) PCT No.: PCT/IB2017/051554
§ 371 (c)(1),
(2) Date: Nov. 25, 2020

(87) PCT Pub. No.: WO2017/158560
PCT Pub. Date: Sep. 21, 2017

(65) Prior Publication Data
US 2021/0081633 A1    Mar. 18, 2021

(30) Foreign Application Priority Data

Mar. 18, 2016  (DE) .......................... 102016105102.0

(51) Int. Cl.
*G06K 9/00*         (2022.01)
*G06T 7/155*        (2017.01)

(52) U.S. Cl.
CPC ................. *G06K 9/00* (2013.01); *G06T 7/155* (2017.01)

(58) Field of Classification Search
CPC ........... G06K 9/00127; G06K 2209/01; G06K 9/00087; G06K 9/0014; G06K 9/00147;
(Continued)

(56) References Cited

U.S. PATENT DOCUMENTS 5,436,979 A * 7/1995 Gray .......................... G06T 5/20
                                                     348/92
6,233,364 B1 * 5/2001 Krainiouk ................. G06T 5/20
                                                     382/205
(Continued)

FOREIGN PATENT DOCUMENTS

GB          2423150 A      8/2006
GB          2466818 A      7/2010
(Continued)

OTHER PUBLICATIONS

Image processing and recognition for biological images (Year: 2013).*
(Continued)

*Primary Examiner* — Nizar N Sivji
(74) *Attorney, Agent, or Firm* — Hunton Andrews Kurth LLP

(57) ABSTRACT

Method for examining a multiplicity of distributed objects (1) by using an overview image (200) of the area (2) in which the objects (1) are distributed, wherein the overview image (200) is converted (110) into a binary image (210) by virtue of the intensity values (202) of the pixels (201) of the overview image (200) being classified (202*a*, 202*b*) as to whether they are on the near or far side of a prescribed threshold (208); the binary image (210) is cleared (120) of structures (219) that are smaller than the objects (1), so that a cleared image (220) is produced; and the cleared image (220) is morphologically closed (130), so that a binary object mask (230) is produced that indicates which locations in the area (2) belong to objects (1) and which locations in
(Continued)

Figure 1:
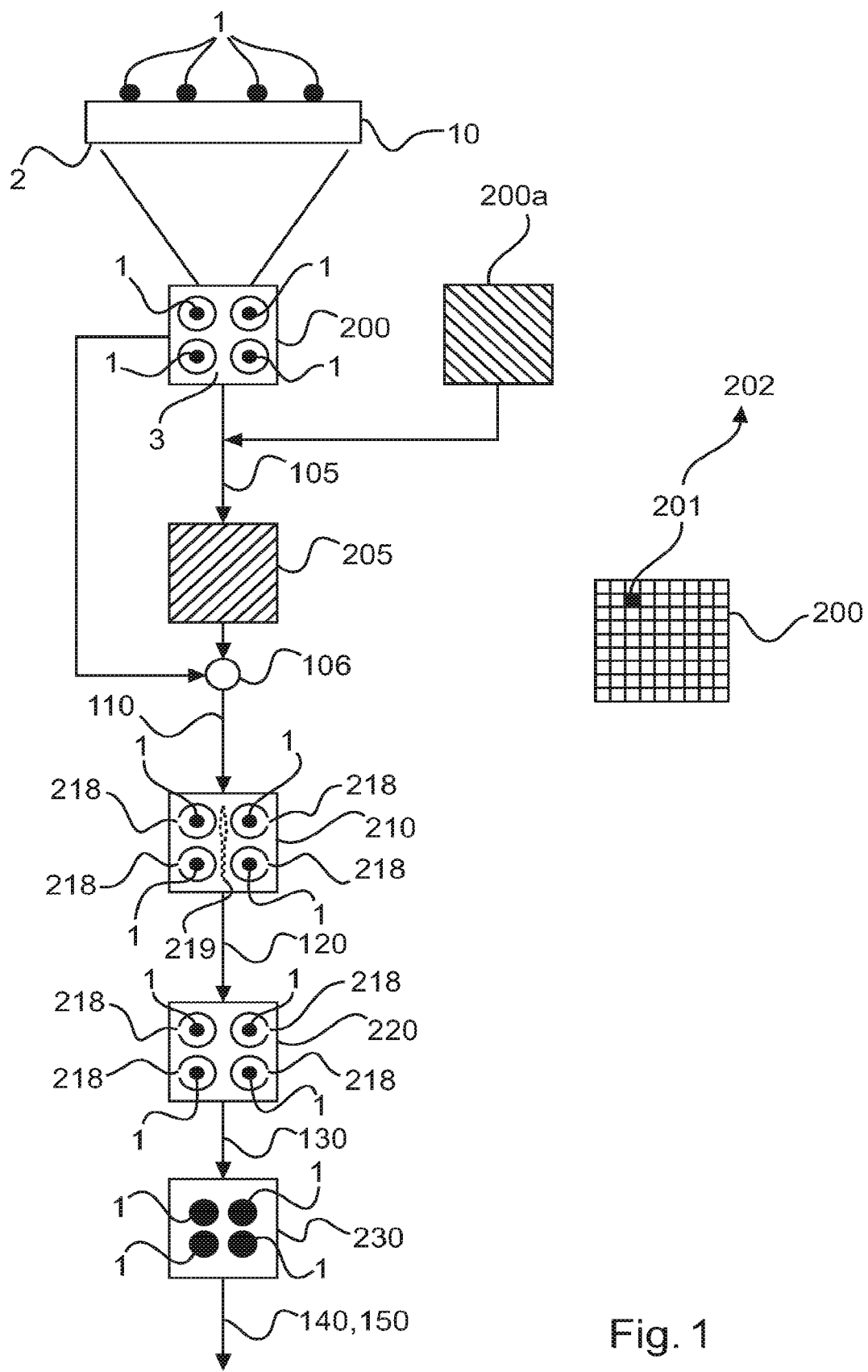

the area (2) do not belong to an object. A computer program product, including a machine-readable program having instructions that, when the program is executed on a computer, prompt the computer and any measuring apparatus connected thereto to perform the method according to the invention.

19 Claims, 5 Drawing Sheets

(58) Field of Classification Search
CPC ........ G06K 9/3233; G06K 9/00; G06T 7/155; G06T 7/11; G06T 2207/10056; G06T 2207/30024; G06T 7/136
See application file for complete search history.

(56) References Cited

U.S. PATENT DOCUMENTS

| | | | | |
|---|---|---|---|---|
| 2003/0053692 | A1* | 3/2003 | Hong | H04N 19/23 382/171 |
| 2006/0098858 | A1* | 5/2006 | Guittet | G06K 9/00127 382/133 |
| 2008/0280777 | A1* | 11/2008 | Bittner | G16B 5/00 506/9 |
| 2008/0292194 | A1* | 11/2008 | Schmidt | G06T 7/11 382/217 |
| 2010/0135566 | A1* | 6/2010 | Joanidopoulos | G06K 9/00147 382/133 |
| 2010/0215227 | A1* | 8/2010 | Grunkin | G06T 7/0012 382/128 |
| 2010/0329536 | A1* | 12/2010 | Muschler | G06T 7/11 382/133 |
| 2013/0279789 | A1* | 10/2013 | Elter | G06K 9/00127 382/134 |
| 2014/0205174 | A1* | 7/2014 | Kask | G06T 7/11 382/133 |
| 2015/0071541 | A1* | 3/2015 | Qutub | G06T 7/11 382/173 |
| 2015/0078641 | A1* | 3/2015 | Tan | G06T 7/12 382/131 |
| 2016/0058288 | A1* | 3/2016 | DeBernardis | A61B 5/0075 600/477 |
| 2017/0244976 | A1* | 8/2017 | Taylor, II | G06T 5/002 |

FOREIGN PATENT DOCUMENTS

| | | | | |
|---|---|---|---|---|
| JP | 2008304298 | A | * 12/2008 | |
| WO | 9316442 | | 8/1993 | |
| WO | WO-2006087526 | A1 | * 8/2006 | .......... G06T 7/0012 |
| WO | 0004497 | | 1/2007 | |
| WO | WO-2015015941 | A1 | * 2/2015 | ............. G01N 21/65 |

OTHER PUBLICATIONS

Automatic segmentation of adherent biological cell boundaries and nuclei from brightfield microscopy images (Year: 2011).*
A Threshold Selection Method from Gray-Level Histograms (Year: 1979).*
First Examination Report dated Feb. 13, 2017 for German Patent Application No. 10 2016 105 102.
International Search Report dated Jun. 13, 2017 for International Application No. PCT/IB2017/051554.
Written Opinion dated Jun. 13, 2017 for International Application No. PCT/IB2017/051554.
Sahoo, P.K. et al., "A Survey of Thresholding Techniques," Computer Vision, Graphics, and Image Processing, vol. 41, pp. 233-260, Feb. 1, 1988.
Blackledge, Jonathan et al., "Targeting Cell Nuclei for the Automation of Raman Spectroscopy in Cytology," [From the Internet], http://arrow.dit.ie/cgi/viewcontent.cgi?article=1205&context=engscheleart, Jan. 1, 2012.

* cited by examiner

METHOD FOR EXAMINING DISTRIBUTED OBJECTS BY SEGMENTING AN OVERVIEW IMAGE

CROSS-REFERENCE TO RELATED APPLICATION(S)

This application relates to, and claims the benefit and priority from International Patent Application No. PCT/IB2017/051554 filed on Mar. 17, 2017, and published as International Publication WO 2017/158560 on Sep. 21, 2017, which claims the benefit and priority from German Patent Application No. 10 2016 106.0 filed on Mar. 18, 2016, the entire disclosures of all of which are incorporated herein by reference.

The invention relates to a method for examining objects that are statistically distributed in an area.

PRIOR ART

In examining biological samples it is essential to study the properties of individual cells. Such samples typically include a statistical distribution of cells on a substrate. Before a cell can be examined, it must first be located on the substrate.

So far, the cells have been visually localised, and a localized examination of a single cell, such as Raman spectroscopy, has been initiated manually. This was very time-consuming and led to the fact that only small numbers of cells could be examined. The more cells are examined, the better the statistical capacity of the results obtained.

From (R. Ali, M. Gooding, T. Szilgyi, B. Vojnovic, M. Christlieb, M. Brady, "Automatic segmentation of adherent biological cell boundaries and nuclei from brightfield microscopy images", Machine Vision and Applications 23 (4), 607-621, doi: 10.1007/s00138-011-0337-9 (2011)), from (F. Buggenthin, C. Marr, M. Schwarzfischer, P. S. Hoppe, O. Hilsenbeck, T. Schroeder, F. J. Theis, "An automatic method for robust and fast cell imaging in bright field images from high-throughput microscopy", BMC Bioinformatics 14, 297-308 (2013)) and (C. Zhang, J. Yarkony, F A Hamprecht, Cell Detection and Segmentation Using Correlation Clustering, Medical Image Computing and Computer Assisted Intervention—MICCAI 2014, Lecture Notes in Computer Science 8673, 9-16 (2014)) various approaches for the localization of cells on a substrate are known.

PROBLEM AND SOLUTION

Object of the present invention is to further develop the aforementioned approaches and thereby improve the examination of a plurality of distributed objects.

This object is achieved by a method according to the invention according to the main claim and by a computer program product according to the dependent claim. Further advantageous embodiments will be apparent from the dependent claims.

SUBJECT OF THE INVENTION

Within the scope of the invention, a method has been developed for examining a plurality of distributed objects using an overview image of the area in which the objects are distributed.

The area may, for example, be located on a substrate on which the objects are applied. The objects may be, for example, biological cells, in particular eukaryotic cells, which are applied to the substrate, for example in a solution or as a suspension in a solvent. In doing so, the cells can adhere to the substrate, i.e., conjoin with the substrate, or remain separate units from the substrate, which are held in place on the substrate only by weak physical forces. Optionally, how the cells are bonded to the substrate can also be tailored by applying a coating to the substrate. For example, poly-L-lysine or poly-D-lysine coating may cause cells not to adhere to the substrate and/or cells to remain at a particular position on the substrate, although they will not adhere there.

On the other hand, the objects do not necessarily have to be of a biological nature. The objects can also be, for example, dust particles that have been collected with a filter or an adhesive film, for example.

The overview image is advantageously an image in which the entire area in which the objects are distributed is captured and displayed in parallel. In particular, it may be a microscopic brightfield image of the area. Such an image is readily available, and imaging does not affect the objects themselves or their positions in the area. In principle, however, the overview image can also be obtained by any other method, for example by fluorescence microscopy or scanning probe microscopy. The operating parameters are then only to be chosen so that the objects remain essentially unchanged and do not change their position in the area.

In particular, the overview image can be a grayscale image in which each pixel is assigned exactly one intensity value. The overview image can, however, also be, for example, a color image. A color image may be understood as an aggregation of multiple channels, in which each channel a particular property is varied from pixel to pixel, analogous to a grayscale image. For example, a color image may be an overlay of a plurality of sub-images each associated with a base color, such as red, green, and blue in an RGB color image, or cyan, magenta, yellow, and black in a CMYK color image. There are three sub-images in the HSV color space, which describe the spatial distribution of the three properties color value (hue), saturation (saturation) and brightness value (value) in analogy to a grayscale image. For the further examination, a single one of these sub-images or a computation of several or all sub-images to a gray scale image can now be used in each case. Without loss of generality, it is assumed below that there is a gray-scale image.

The objects can be distributed in the area in any concentration. The concentration that makes sense depends on the particular application. In the examination of possible pathological changes in biological cells, for example, it is important to examine cells individually. It makes sense if the concentration of the cells is only so large that at least most of the cells in the area are still clearly distinguishable from each other. On the other hand, if, for example, dust particles are examined in order to search for asbestos, it is less important if particle aggregation occurs.

In particular, the distribution of the objects can be statistical. However, it can also be self-organized, for example, or the objects can also be arranged, for example, totally or partly at defined locations on a substrate, which have been previously structured accordingly on the substrate.

According to the invention, the overview image is first converted into a binary image by classifying the intensity values of the pixels of the overview image as to whether they are on this side or beyond a predetermined threshold. The binary image thus assigns each of the two possible values 0 or 1 to each pixel, depending on which of the two classes "this side" or "beyond" it belongs to. For example, without limitation of generality, "this side" may mean "less than or equal to the threshold" and be assigned the value 0, and "beyond" may mean "greater than the threshold" and be assigned the value 1.

The binary image is a first clue as to where objects are. For example, to determine the contour of objects and thus, for example, an associated center, the binary image is not sufficient. Thus, due to the discretization into only two classes, a contour taken directly from the binary image will generally have gaps. These gaps are closed with the mathematical operation of morphological closing, called "closing". This creates a binary object mask which indicates which locations of the area pictured in the overview image belong to objects and which locations of this area do not belong to any object, but instead can be assigned to the empty substrate surface instead.

However, a real-life overview image is generally not free of errors or artifacts, for example, which are based on noise. Such errors and artifacts create structures that are smaller than the objects. If morphological closure is applied to these structures, they can grow to a size comparable to that of the sought objects. The errors and artifacts in the binary object mask would no longer be distinguishable from the real objects.

In order to avoid this, according to the invention, the binary image is cleaned up for structures which are smaller than the objects, so that a cleaned-up image results. Only this cleaned-up image is further processed into a binary object mask. Thus, after the generation of the binary image, the additional information as to which size the sought objects at least have is utilized in order to distinguish these objects from errors and artifacts. The inventors have recognized that the consideration of such additional information at this time in the process is the most effective and allows a particularly reliable distinction. As a result, the obtained binary object mask is a particularly reliable indicator of which locations of the area mapped in the overview image belong to objects.

The cleaning is especially important when the binary object mask is used to determine at which locations, for example, Raman spectra are taken. The number of perturbations and artifacts before the cleanup is usually many times higher than the number of the objects to be examined. If these perturbations and artifacts are erroneously recognized as objects, a plurality of non-relevant Raman spectra may be recorded. This not only costs unnecessary time but also complicates the statistical analysis of the spectra or even makes this analysis impossible.

Already from the binary object mask many information about the objects can be derived. For example, the exact size and shape of the objects can be seen from the binary object mask. Also, from the proportion of locations (pixels) belonging to objects, the concentration of the objects in the area becomes apparent. However, the binary object mask can also be used as a preliminary product to determine those locations where further examinations are being performed.

To define the predetermined threshold, three methods have been found to be particularly advantageous and reliable in the experiments of the inventors. All three methods are based on the evaluation of histograms over the intensity values of the pixels of the overview image. These intensity values are typically discretized to a certain number of possible values, for example, integer values from 0 to 255 for 8-bit resolution and from 0 to 65535 for 16-bit resolution.

According to the first method, the threshold is set such that it lies in the middle between a first mean value $m_0$ of all intensity values of pixels (201a) of the overview image which are below the threshold, and a second mean value $m_1$ of all intensity values of pixels of the overview image which are above the threshold. This can be understood as a self-consistent condition for the threshold, since the mean values $m_0$ and $m_1$ in turn depend on the threshold. The advantage of this method lies especially in the context of microscopic bright field images as overview images in that the lighting conditions have particularly low impact on the finally obtained binary object mask.

For example, the correct threshold can be determined by testing how well the self-consistent condition is satisfied for all possible discrete values of the threshold. The threshold is chosen for which the condition is best fulfilled. The computation time required for this depends on how finely the intensity values of the overview image are discretized, because as many threshold values are possible as there are possible intensity values. If the intensity values are very finely discretized, an optimization algorithm that uses the fulfillment of the self-consistent condition as a measure of quality can also be used as an alternative for testing all possible values.

According to the second method, the threshold is set such that the sum of a first variance of all intensity values of pixels of the overview image that are below the threshold weighted with the number of these intensity values, and a second variance of all intensity values of pixels of the overview image that are above the threshold weighted with the number of these intensity values, is minimized. If $\omega_{0,1}(s)$ are the probabilities dependent on the value s of the threshold that an intensity value of a pixel belongs to class 0 or 1, and if $\sigma_{0,1}^2(s)$ are the variances of the pixels within these classes, which also depend on the value s of the threshold, then the weighted sum $\sigma_\omega^2(s)$ is given by $$\sigma_\omega^2(s)=\omega_0(s)\cdot\sigma_0^2(s)+\omega_1(s)\cdot\sigma_1^2(s),$$

Even minimizing this weighted sum is a self-consistent condition, because which intensity values are above or below the threshold depends in each case again on the threshold value. In this condition, the underlying assumption, motivated by the typical shape of experimentally determined overview images, is that in the overview image the greatest contrast is established between objects on the one hand and areas belonging to no object on the other hand, while measured against that, the areas belonging to no object as well as the objects are measured, each taken separatievely, are comparatively homogeneous. Accordingly, the minimization of the intraclass variance is a plausible indicator that the locations represented in the overview image, which are represented by the pixels of the overview image, were usefully divided into the two classes "object" and "no object".

This condition is equivalent, according to the work of Otsu, to the fact that the interclass variance between the intensity values below the threshold, on the one hand, and the intensity values above the threshold, on the other hand, is maximized. The interclass variance $\sigma_i^2(s)$ is given by $$\sigma_i^2(s)=\omega_0(s)\cdot\omega_1(s)\cdot[m_0(s)-m_1(s)]^2,$$

in which—analogous to the first method—$m_0$ (s) and $m_1$ (s) are again the class mean values dependent on the value s of the threshold value. The interclass variance can be determined with less computational effort than the sum of both intraclass variances.

According to the third method, the threshold is set such that the matching of at least one statistical moment of the binary image with the corresponding statistical moment of the overview image is maximized. For example, this statistical moment may be the mean or the variance. Similar to the second method, this method is based on the basic assumption that a contrast in the overview image should appear essentially between the objects and the areas that belong to no object, while the objects themselves, as well as the areas belonging to no object, respectively should be relatively homogeneous. The ideal overview image should therefore be approximately a binary image that can be used directly as a binary object mask. The real overview image is considered to be a version of this ideal binary overview image that is blurred (washed out) by the imaging process, where blurring has no effect on the statistical moment. Thus, by choosing the statistical moment as the conserved quantity, the information content with respect to the distinction between objects and areas belonging to no object is not changed, but only made clearer. Accordingly, the third method is particularly advantageous if the overview image has only a low contrast.

All three methods can also be used in combination, and/or the determined values s for the threshold can be used to be offset against each other to one total value applied to the binary image.

In a particularly advantageous embodiment of the invention a background estimate is obtained from the overview picture by blurring with a strength that essentially removes the objects, and the overview image is replaced by its difference to the background estimate prior to conversion into the binary image. In this way, the influence of uneven illumination on the finally obtained binary object mask is further suppressed. Thus, after the differential image has been formed, all further operations then proceed only from this difference image and no longer from the original overview image.

Alternatively or in combination, an background estimate can be obtained by recording a second overview image that is free of objects. The background estimate is then available as a background image. Each pixel of this background image can then, for example, be normalized to the maximum intensity of the background image. The overview image can then be divided pointwise prior to conversion into the binary image through the normalized background estimate.

In a further particularly advantageous embodiment of the invention, at least one common boundary of adjacent objects is split into a first boundary of the first object and a second boundary of the second object in the binary object mask. In this way, objects can be separately recognized and studied even if their concentration in the area imaged in the overview image is so high that they are agglomerated. For this purpose, for example, the watershed transformation can be used, which interprets the pixel values 0 and 1 of the binary object mask as height information and, in a successive "flooding", elaborates watersheds between adjacent objects.

Advantageously, the center point of at least one object is evaluated from the binary object mask. This point is important for many further examinations of the object.

In a further particularly advantageous embodiment of the invention, at least one location in the area where an object is located according to the binary object mask is irradiated with a light beam, and the response of the object to the irradiation is evaluated. In this case, the light beam may in particular be a laser beam. The examination with a light beam is non-invasive and can be carried out with high spatial resolution down to the diffraction limit of the light beam used. If necessary, the diffraction limit can be circumvented by the use of near-field light.

Conversely, the light beam can also be widened so that the entire object is illuminated. Here it is particularly advantageous if the center of the object is selected as the center of the light beam position. To prevent edge effects, the intensity distribution of the light beam can be homogenized, for example, by superimposing several modes ("mode scrambling"). Alternatively or in combination, the light beam can be further widened so that that part of its beam profile which illuminates the object is approximately homogeneous. This, in turn, comes at the expense of intensity.

In a further particularly advantageous embodiment of the invention, the light beam is scanned relative to the object by means of the binary object mask. The scanning can be done by moving the laser beam against the object, by moving the object against the laser beam or by moving both the laser beam and the object.

Taking into account the spatial intensity distribution of the light beam, the timing program of the scanning is selected such that the spatial distribution of the total received light dose is homogenized over the object. For example, a laser beam has in a first approximation a Gaussian beam profile across its beam cross-section. If this beam is centered at the center of an object, the object is irradiated with an inhomogeneous intensity. If the object is not structured homogeneously but has, for example, a different material composition in the middle than at the edge, then in the response to the irradiation received by the object, this material contrast is superimposed with an artifact due to the inhomogeneous irradiation intensity. This occurs especially in eukaryotic biological cells as objects in which the nucleus consists of a different material than the rest of the cell. Such artifacts are advantageously minimized by the timing program which homogenizes the received dose of light over the object.

In a particularly advantageous embodiment of the invention, at least one Raman spectrum of the object is evaluated from the response to the irradiation. In Raman scattering, photons are inelastically scattered on molecules, so that energy is exchanged between the photons and the excited states of the molecule. Since these excited states are characteristic of each molecule, Raman scattering provides a molecule-specific "fingerprint" of the irradiated region. Hereby pathological changes can be made visible in particular in cells of biological samples, such as those that may be caused by cancer.

The combination of Raman spectroscopy with the extraction of the binary object mask makes it possible to automate a Raman screening on a variety of cells of a biological sample. So far, such examinations could be carried out only on a few cells of a sample, as repeatedly a Raman spectrum had to be recorded and then the sample had to be moved relative to the focus of the excitation laser manually, before the next Raman spectrum could be recorded at the next cell of interest. Typically, significantly fewer than 100 cells were examined in such a study. By making it practicable to examine all the cells visible in an overview image successively, the examination can be carried out on 100,000 or more cells.

The result of the examination is then statistically much better resilient, and the examination is cheaper because of the reduced staffing. Some examinations are even possible with the thus increased throughput. For example, if cells are divided into different classes using statistical methods, the classification becomes more reliable the more cells can be examined. In particular, the reliability of a statistical classification method depends heavily on how many cells were examined in the training phase of the method. For example, cells can be classified according to cell type or whether they are healthy cells or tumor cells. For example, a hemogram of white blood cells can also be made.

If rare changes are to be detected which occur, for example, only at one cell per 1,000 or per 10,000 cells, then the throughput increased according to the invention is also essential in order to be able to make a reliable statement whether the concrete change is present in a biological sample.

In addition, other information can be obtained from the cells, such as the relative content of protein, nucleic acid and lipid, or even the current state of the cell cycle.

At the same time, rapid clinical trials are possible because the rate of change from one cell to the next is not limited by human response time. An analyzer according to the invention arranged for carrying out the method can continue to work fully automatically without manual inspection of images or setting parameters and can thus be operated in the clinical field by staff without prior knowledge. Only cells have to be placed on a suitable slide and the slide has to be delivered to the device.

The slide itself as a substrate does not need to be modified from previous examinations. For example, it can be made of glass, quartz or $CaF_2$.

Of course, once all the objects identified in the binary object mask have been examined, the process can automatically be repeated with a new area. For example, areas on a larger biological sample that correspond in size to the spatial coverage area for the overview image can be examined successively. From the overview image, a binary object mask can be obtained in each case in the manner described, and all objects (cells) identified in this binary object mask can be automatically brought into the focus of the excitation laser and examined in turn.

Alternatively or in combination for receiving a Raman spectrum, for example, a material sample can also be evaporated off the object by the laser beam and fed to a mass spectrometer. In this way, the material of the object can be analyzed element-specifically.

In a further particularly advantageous embodiment of the invention, the cells on the substrate are exposed to an influence and irradiated with the light beam repeatedly. In each case the response of the cells to the irradiation is evaluated.

For example, the development of the cells under the influence of chemical substances, the incorporation of isotopes or other substances having an influence on the molecular vibrational modes, but also ionizing radiation or nutrient reduction, or an interaction between various cell types present on the substrate can be studied. However, for example, natural processes, such as growth and multiplication processes, can be studied under the influence of the cell culture medium, the ambient temperature or an elevated incubation temperature. Furthermore, a change of the cells induced by the composition of the incubation gases can be studied.

It has been recognized that the ability provided by the invention to analyze distributed cells on a substrate in an automated manner, reduces the measurement uncertainties so much that the effects of the influence on the cells from the responses to the irradiation can be determined with sufficient statistical significance. In the prior art, the distributed cells had to be manually located for each measurement, and then the local irradiation had to be triggered manually for each cell. On the one hand, this was very labor-intensive, so that the number of cells included in the statistical basis of the examination was limited from the outset. By now always examining a statistically significant number of cells, a variety of examinations, such as the detection of existing populations of cells, for example, in the examination of white blood cells or cells present in small numbers in a significantly more numerous population of other cells, are made possible for the first time. Furthermore, the approach described allows a rapid analysis of cell processes in which the processes take place very rapidly and therefore only very short time windows are available for the measurements. On the other hand, the repeatability of manually performed examinations is limited. There are many biological processes running also comparatively slowly, so that hours or days may be between two examinations carried out on the substrate after the exposure to different doses of influence. In the prior art, the experimental variations in measurements performed manually were usually greater than the changes in the responses to the irradiation due to the influence on the cells. The fluctuations become even greater when working in shift operation and the operator changes between the individual measurements. On the other hand, so far no experiments can be performed over a very long time scale, such as days or even weeks, since it is not possible for a user to manually track a large number of cells over such a long period of time and view the same cells over that period of time.

By now being able to automatically relocate and examine the cells, it is possible, for example, to repeat the examination around the clock at fixed time intervals under always the same experimental conditions.

The same applies in a further particularly advantageous embodiment of the invention, in which cells on a plurality of substrates are irradiated with the light beam, wherein the responses of the cells to the irradiation are combined across substrates. Here, further uncertainties are added when performing the test procedure manually, because, for example, a microscope is cleaned-up slightly differently each time after the installation of a new substrate.

In a further particularly advantageous embodiment of the invention, the totality of the responses is evaluated with a multivariate analysis as to which properties of the cells change in a statistically significant manner under the influence exerted and/or from one substrate to another. In particular, hyperspectral magnitudes can be determined here, that is, it can be automatically determined which properties of the cells change in a correlated manner. The multivariate analysis can be carried out in particular without a priori assumptions ("unsupervised").

In the multivariate analysis, a partial result is by no means determined individually on each substrate in order to finally merge the partial results. Rather, the analysis is performed in one operation on all responses obtained from the cells on all substrates. In order that the result of the analysis is not diluted, it is important that all answers were obtained under the same experimental conditions. Thus, the mechanization of examining a variety of cells made possible by the invention makes the multivariate analysis meaningful in the first place.

The result of such an analysis may be, for example, that cells undergo certain measurable changes under the continued action of a pharmacological substance, wherein these changes progress linearly or non-linearly with time, but the faster the greater is the concentration of the pharmacological substance. Conversely, then, for example, the cell characteristics that change in such a correlated manner may be recognized as early markers for the onset of apoptosis or necrosis. However, it is also possible to consider the incorporation of substances that are present in different concentrations into the cells and to draw conclusions about the kinetic properties of these substances and the cell kinetics. These could be isotopically labeled molecules or other biochemical substances such as fatty acids and proteins. The changes may lead to conclusions about the uptake kinetics of the cells.

Advantageously, the Principal Component Analysis, PCA, is chosen as a multivariate analysis. Here, for example, a Raman spectrum obtained in response to the irradiation in a resection model can be regarded as a weighted superposition of several partial spectra, each resulting from different contributions ("loadings"). The PCA ultimately transforms the original data into a coordinate system whose dimensionality is reduced to the linearly independent main components and thus causes a strong compression of the original data. Alternatively or in combination with this, spectra of pure components may be fitted to the measured spectra using least squares fitting.

In a further particularly advantageous embodiment of the invention, a classifier is evaluated from the multivariate analysis, which assigns the responses to the irradiation received at cells on a further substrate at least one value of a property which applies to this substrate.

For example, by examining a variety of substrates with cells from different cancer patients in conjunction with the information on how long the patients have lived after removal of the cells, this survival time can be taken as an indication of the severity of the disease. From the multivariate analysis, it is then possible, for example, to evaluate a classifier that assigns first the property whether cancer is present or not to cells on a further substrate with a certain probability, and possibly assigns the severity, for example in classes on a scale of 1 to 5. However, also the composition of blood, as well as changes in the ratios of the cell types in the blood can be analyzed with this method. Furthermore, this method can be used to determine the influence of different pharmacological substances on the cells of a patient, for example to determine the correct therapeutic, in the sense of a personalized medicine for the patient. With regard to the analysis of the influence of pharmacological substances on cells, it is also possible to determine the concentrations above which a substance has a toxic effect on the cells. This way, a threshold for the effectiveness of the substance can be specified. However, the proposed approach also makes it possible to analyze the accumulation of externally added substances or substances that arise in biological processes taking place. The proposed method further makes it possible to detect the accumulation of substances in cells under different influencing factors, such as temperature, composition of the cell culture medium, etc.

The classifier may be evaluated, for example, by Linear Discriminant Analysis, LDA; or Support Vector Machine, SVM. Multivariate regression studies can also be performed. Furthermore, the presence or alteration of one or more substances previously defined clearly can also be determined on the substrates using the least squares fitting.

In each case, it is possible in an organic way to correlate the results with influences that have been exerted on the cells.

The invention also relates to a computer program product with a machine-readable program. When the program is executed on a computer, the computer and any measuring equipment connected thereto are caused to carry out the method according to the invention. Such a computer program product can in particular be used to automate an existing measuring station on which previously overview images were evaluated manually and on which the recording of Raman spectra at individual cells was subsequently triggered manually. Thereby, the throughput of this measuring station can be increased in orders of magnitude, which would be illusory in manual processing.

SPECIAL DESCRIPTION PART

The subject matter of the invention will be explained below with reference to figures, without the subject matter of the invention being limited thereby. It is shown:

FIG. 1: Embodiment of the method according to the invention.

Figure 2:
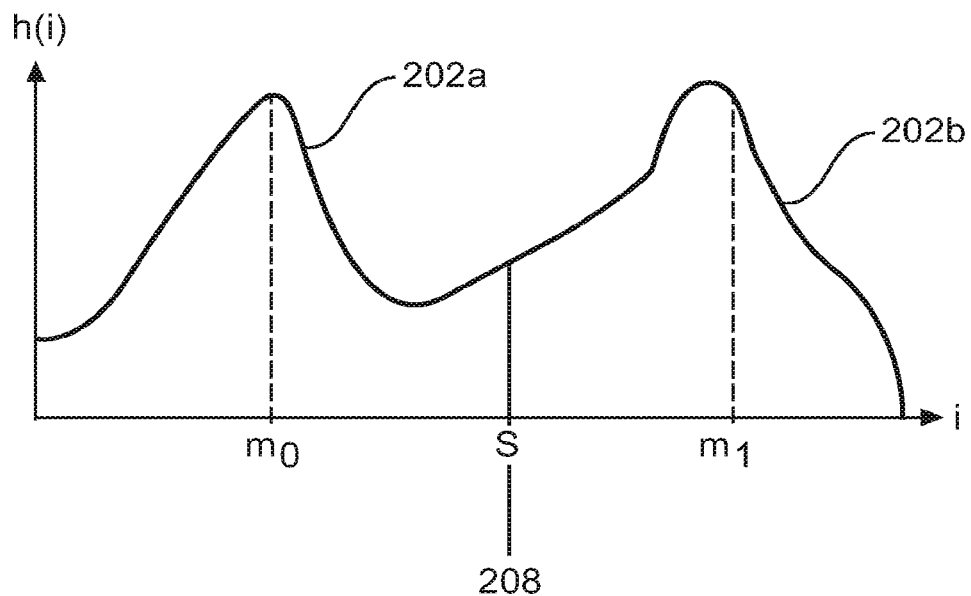

FIG. 2: Exemplary embodiment for the automatic determination of the threshold 208.

Figure 3:
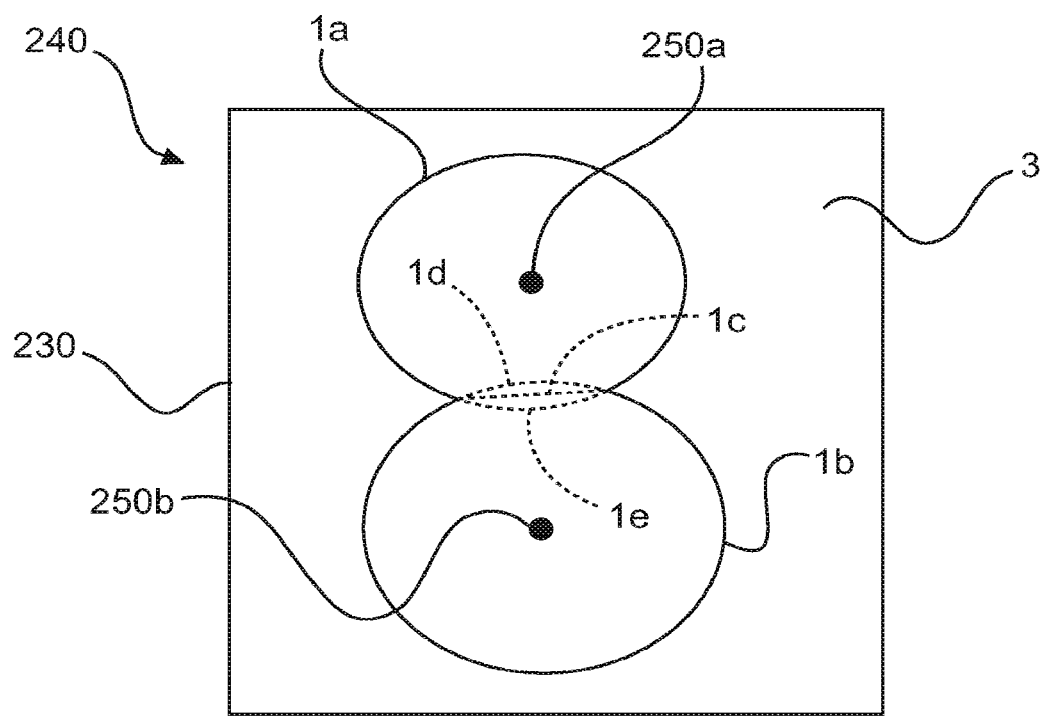

FIG. 3: Sketch of the splitting 240 of a common boundary 1c of adjacent objects 1a, 1b.

Figure 4:
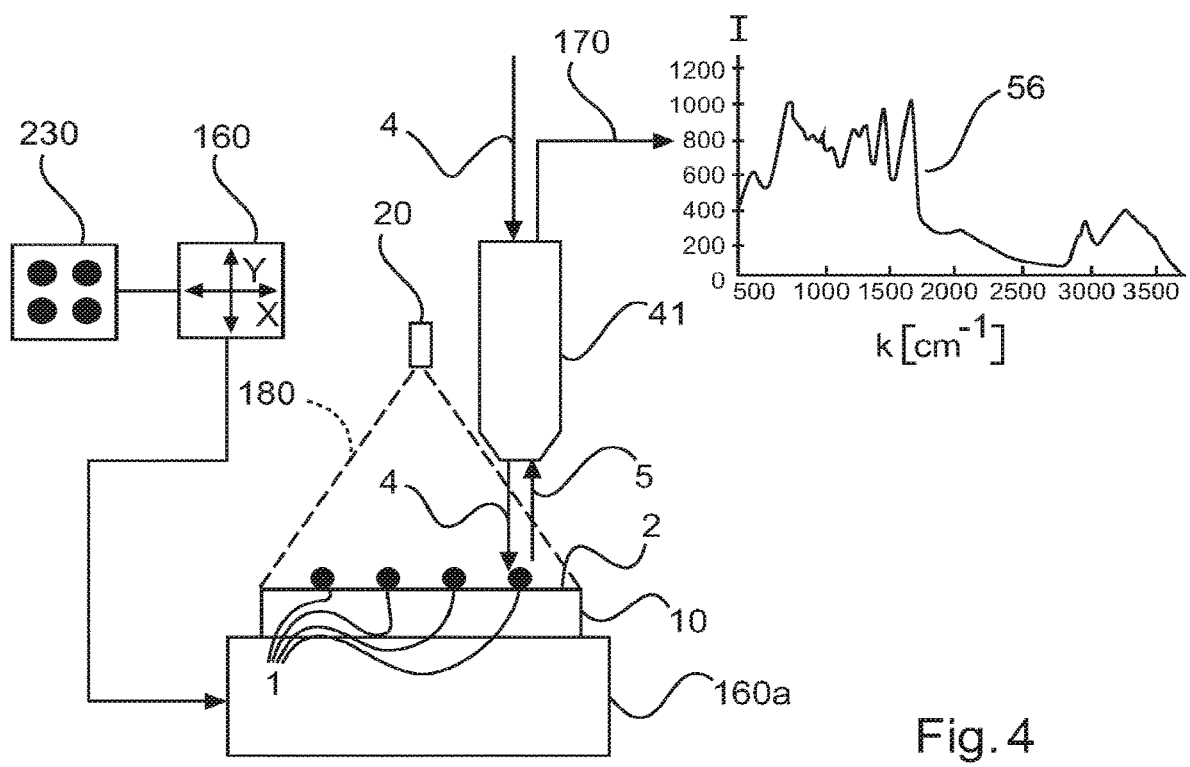

FIG. 4: Irradiation 160 of an object 1 with laser light 4 and evaluation 170 of the response 5 to a Raman spectrum 6.

Figure 5:
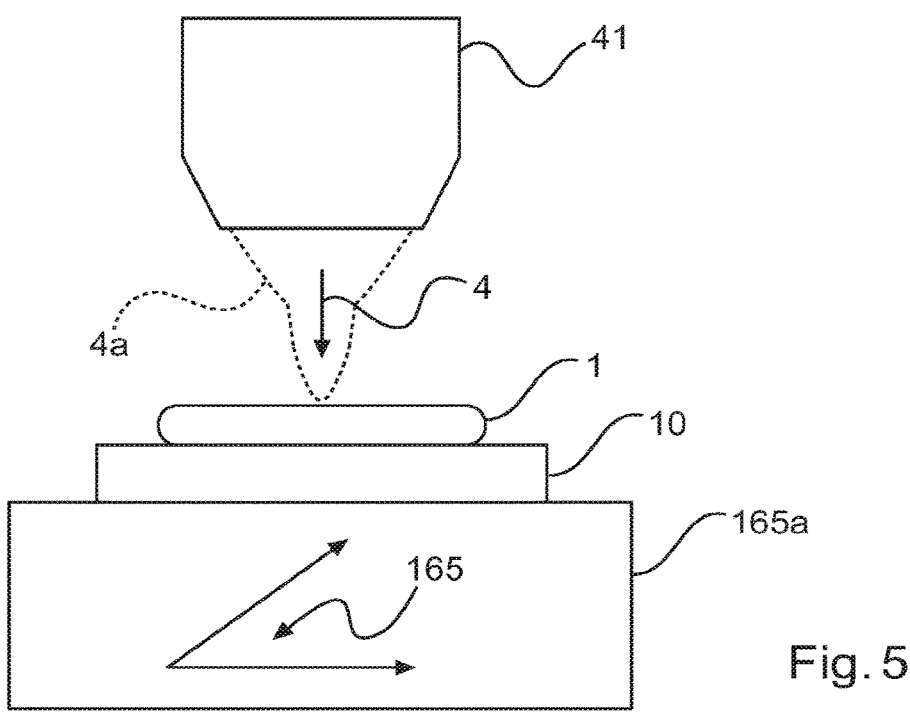

FIG. 5: Homogenization of the total light dose received by the object 1 by scanning 165 the laser beam 4 according to a timing program on the basis of its beam profile 4a.

Figure 6:
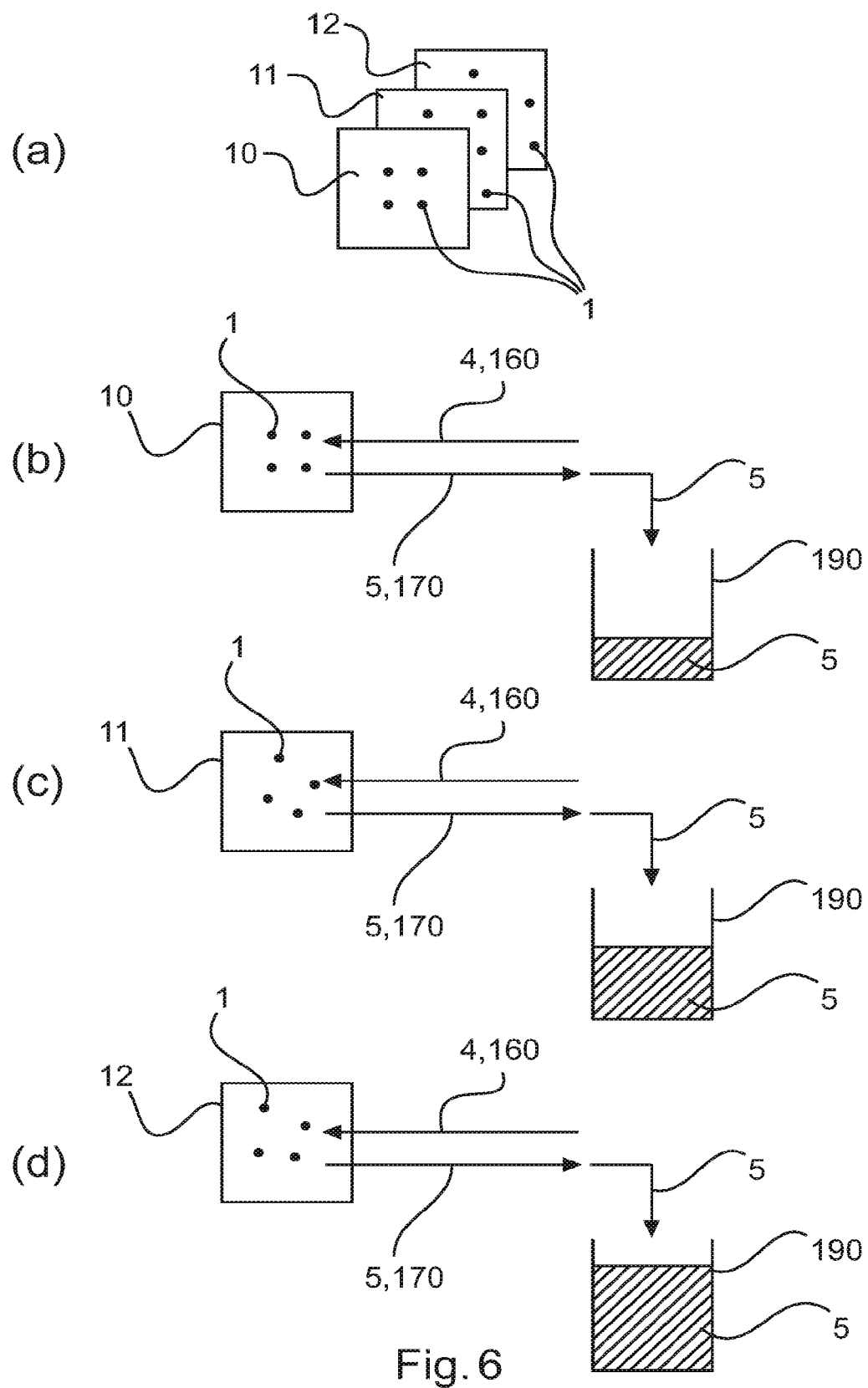

FIG. 6: Cross-substrate merging 190 of responses 5 of the objects 1 sitting on the different substrates 10-12 to the irradiation 160.

Figure 7:
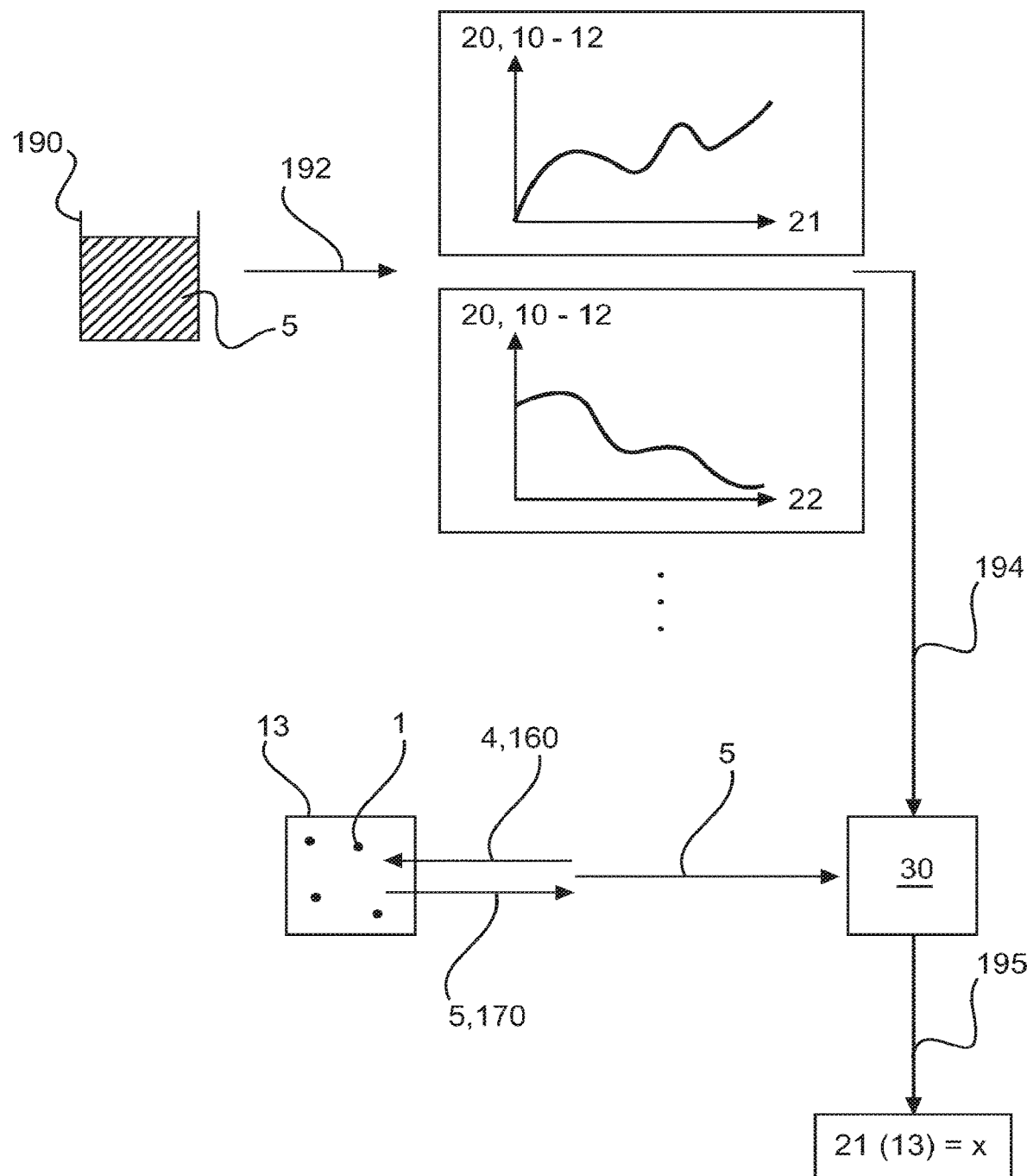

FIG. 7: Multivariate analysis 192 for determining correlated properties 21-22, evaluation 194 of a classifier 30 and application 195 of this classifier 30.

FIG. 1 outlines the sequence of an embodiment of the method according to the invention. On a substrate 10, a plurality of cells are applied as objects 1. For the sake of clarity, pictorial representations of these objects 1 will also be designated by the same reference sign 1 below.

The method starts from an overview image 200 of the area 2 in which the objects 1 are distributed. The overview image 200 is subdivided into pixels 201, which are each assigned intensity values 202. In the overview image 200, the objects 1 appear on a background 3. From this overview image 200, an estimate 205 of the background 3 is first obtained in a first step 105 by blurring. The estimate 205 may alternatively or in combination be obtained from a second overview image 200a, which is free of objects 1. The original overview image 200 is offset in the next step 106 by subtraction, or by pointwise dividing, with the background estimation 205.

From the result in which the contrast of the objects 1 is significantly increased, a binary image 210 is obtained in the next step 110. In this binary image 210 there are no more gradations of intensities, but only the two values 0 and 1. This discretization initially has the consequence that gaps 218 in the representations of the objects 1 arise in the binary image 210. Furthermore, structures 219, which are smaller than the objects 1, are also generated from errors and artifacts of the image recording.

In order that the structures 219 in the further processing do not grow and grow together in such a way that they are misinterpreted as further objects 1, the binary image 210 is cleaned by these structures 219 in the next step 120. An cleaned-up picture 220 is generated.

This cleaned-up image 220 is morphologically closed in the next step 130. In the resulting binary object mask 230, the objects 1 appear as solid areas. If such surfaces abut one another, they can be separated from one another in a further optional step 140. In a further optional step 150, center points of objects can also be evaluated.

FIG. 2 shows by way of example the evaluation of a histogram of the intensity values 202 of the pixels 201 of an overview image 200. The frequence of occurrence h (i) of the pixels 201 in the overview image 200, which carry the intensity value i, is plotted above each possible intensity value i. The value s for the threshold 208 separating the pixels 201 into the two classes "belonging to objects 1" and "not belonging to objects 1" lies in the middle between the first mean value $m_0$ of those intensity values 202a, which are below the value s, and the second mean value $m_1$ of those intensity values 202b, which are above the value s. Both mean values $m_0$ and $m_1$ in turn depend on the value s of the threshold 208. The value s is therefore self-consistent to determine, for example by testing all possible discrete values between the minimum and the maximum possible intensity value 202, and/or with an optimization algorithm that uses the fulfillment of the self-consistency condition as a measure of quality.

FIG. 3 illustrates step 240, in which two adjacent objects 1a and 1b in the binary object mask 230 are separated from one another. For reasons of clarity, the objects 1a and 1b in FIG. 3 are not drawn as solid areas, but only their contours are shown. In addition, the center points 250a and 250b determined in optional step 250 are plotted.

The objects 1a and 1b adjoin one another along a line 1c. This common boundary 1c is split into a first boundary 1d of the first object 1a and a second boundary 1e of the second object 1b spaced apart thereof. In the binary object mask 230 adapted in this way, the contours of the objects 1a and 1b no longer touch, but there is a gap of at least one pixel. In the further use of the binary object mask 230, the two objects 1a and 1b are thus correctly recognized as separate objects 1.

FIG. 4 shows the further examination of an object 1, which has been located through the binary object mask 230 in the area 2, in which the objects 1 are distributed. In a first step 160, the object 1 is irradiated with a laser beam 4. This is realized in the exemplary embodiment shown in FIG. 4 in that the substrate 10, on which the objects 1 are distributed, is moved via an X-Y-position control with associated positioning table 160a such that the laser beam 4 emerging from an objective lens 41 impinges a previously identified object 1.

In doing so, it makes no difference for many applications, whether the objective lens 41 or the substrate 10 is moved. If the Raman scattering is to be examined on an object 1, however, the laser beam 4 should emerge from the objective lens as precisely as possible on the optical axis, since otherwise the chromatic aberration ("spatial response") could falsify the measurement result. It is then advantageous to keep the laser beam 4 exactly cleaned-up to the optical axis of the objective lens 41 and to move the substrate 10 instead. In principle, it would also be possible to move the laser and the objective lens 41 together as a unit, so that the laser beam 4 does not leave the optical axis of the objective lens 41. However, this is more complicated, since in particular a laser with higher power is considerably heavier and more voluminous than a substrate 10.

The response 5 of the object 1, in this case Raman-scattered light, is evaluated in a second step 170. The result is a molecule-specific Raman spectrum 6 of the object 1. The intensity I over the wave number k is plotted.

Optionally, according to step 180, the influence 20 can be exerted on the objects 1. For example, if the objects 1 are cells, they may be exposed to a substance, a temperature, an irradiation or a nutrient deficiency, for example. For example, a comparatively slow-acting influence 20 can continue to act, and meanwhile the objects 1 on the substrate 10 can be repeatedly examined with the steps 160 and 170. The exertion of a faster-acting influence 20 may, for example, alternate with the examination according to steps 160 and 170.

FIG. 5 illustrates the scanning 165 of the laser beam 4 according to a timing program on the basis of the intensity distribution 4a of the laser beam 4. The object 1 in this illustration is an elongated expanded structure on a substrate 10. Analogous to FIG. 4, the scanning 165 again takes place in that the substrate 10 is moved on a positioning table 165a. The laser beam 4 emerging from the objective lens 41 has a beam profile 4a, which is Gaussian in a first approximation. If the objective lens 41, and thus also the laser beam 4, remained in one position, the entire object 1 would not be irradiated. Even if the focus were wide enough to fully capture the object 1, the individual areas of the object 1 would be irradiated very differently. In conjunction with a material contrast within the object 1 could lead to artifacts in the examination of the object 1. The scanning 165 compensates for the effect of the beam profile 4a and thus avoids the artifacts.

In principle, the beam profile 4a of the laser beam 4 can also be homogenized by expanding the laser beam 4 and/or by superimposing several modes ("mode scrambling"). The use of a Gaussian beam, however, offers the advantage that it is possible to work with confocal imaging techniques and, in particular, to create also depth profiles of the object 1.

FIG. 6 schematically shows the combination of the information obtained at a plurality of substrates 10-12. FIG. 6a shows three substrates 10, 11 and 12, which respectively contain different distributions of objects 1, which were taken for example from different blood samples or have been exposed to different substances.

According to FIG. 6b, the objects 1 on the first substrate 10 are first irradiated with light 4 after step 160, and after step 170 the response 5 to the irradiation 160 is evaluated. In step 190, the responses 5 obtained from all objects 1 are merged.

According to FIG. 6c, the objects 1 on the second substrate 11 are now examined in an analogous manner, and the responses 5 obtained are combined in step 190 with the previously obtained responses 5, which is indicated in FIG. 6c by an increased level of responses 5 compared to FIG. 6b.

According to FIG. 6d, the objects 1 on the third substrate 12 are now also examined, and the responses 5 obtained are combined in step 190 with all of the responses 5 obtained so far. FIG. 6d illustrates this with an once again increased level of responses 5 compared to FIG. 6c.

FIG. 7 schematically shows the further evaluation of the responses 5 collected by repeated execution of step 190 from the objects 1 on all three substrates 10-12.

In step 192, the responses 5 are evaluated by multivariate analysis. The result of this analysis is that a number of properties, of which two properties 21 and 22 are sketched by way of example in FIG. 7, is correlated with an influence 20 exerted on the substrates 10-12, or otherwise with the affiliation of the respectively examined object 1 to one of the substrates 10-12.

By further evaluating the multivariate analysis obtained in step 192 according to step 194, a classifier 30 is obtained. With the aid of the classifier 30, the objects 1 on further substrates 13 can be analyzed. The responses 5 of these objects 1 to the irradiation 160 obtained analogously to FIGS. 6b to 6d provide the statement from the classifier 30 in the example shown in FIG. 7 that the value of the property 21 for the objects 1 on the substrate 13 is equal to x. Likewise, the classifier 30 may provide, for example, statements that the objects 1 on the substrate 13 are most similar to the objects 1 on the substrate 10, but least similar to the objects 1 on the substrate 11.

LIST OF REFERENCE NUMBERS 1, 1a, 1b objects
1c boundary between adjacent objects 1a, 1b 1d new boundary of the object 1a
1e new boundary of the object 1b
2 area where objects 1 are distributed
3 background
4 beam of light
4a intensity distribution of the light beam 4
5 response of the object 1 to the light beam
6 Raman spectrum
10-13 substrates
20 influence
30 classifier
41 objective lens
105 obtaining the estimate 205 of the background 3
106 calculation of estimation 205 and overview screen 200
108 definition of threshold 208
110 generation of the binary image 210
120 cleaning the binary image 210
130 morphological closure
140 splitting a common boundary 1c in boundaries 1d and 1e
150 evaluating center points 250a, 250b
160 irradiation of the object 1 with the light beam 4
160a positioning table for irradiation 160
165 scanning the light beam 4
165a positioning table for scanning 165
170 evaluation of the response 5 of the object 1 to the light beam 4
180 exertion of the influence 20 on the objects 1
190 cross-substrate merging of answers 5
192 multivariate analysis
194 evaluation of the classifier 30
195 assignment of a property by the classifier 30
200 overview picture of the area 2
200a second overview image of the area 2 without objects 1
201 overview image of pixels 200
202 intensity values of pixels 201
202a intensity values 202 on this side of the threshold 208
202b intensity values 202 beyond the threshold 208
205 estimation of the background 3
208 threshold
210 binary image
218 gaps in the contours of the objects 1 in the binary image 210
219 structures smaller than objects 1 in the binary image 210
220 cleaned-up picture
230 binary object mask
250a, 250b center points of objects 1a, 1b
h (i) frequency of an intensity value i among the pixels 201
i intensity value
I intensity
k wave number
$m_0$ first mean value of the intensity values 202a
$m_1$ second mean value of the intensity values 202b
s value of the threshold 208

The invention claimed is:

1. A method for examining a plurality of distributed objects using an overview image of an area in which the distributed objects are distributed, comprising:
converting the overview image into a binary image by classifying intensity values of pixels of the overview image as to whether they are below or above a predetermined threshold;
cleaning the binary image of structures which are smaller than the distributed objects to generate a cleaned-up image;
morphologically closing the cleaned-up image to form a binary object mask indicating which locations of the area belong to the distributed objects and which locations of the area belong to no object;
irradiating at least one location in the area at which, according to the binary object mask, at least one of the distributed objects is located, the at least one location being irradiated with a light beam; and
evaluating one or more responses of the at least one of the distributed objects to the irradiation,
wherein biological cells, which are considered as the distributed objects and provided on a substrate, are exposed to an influence, and wherein the biological cells are irradiated repeatedly with the light beam, and the one or more responses of the biological cells to the irradiation are evaluated, and
wherein, based on a totality of the one or more responses, a multivariate analysis is used to evaluate which properties of the biological cells change under the influence in a statistically significant manner.

2. The method according to claim 1, wherein the predetermined threshold is set to be in the middle between (i) a first mean value $m_0$ of all first intensity values of a first subset of the pixels of the overview image which are below the predetermined threshold, and (ii) a second average $m_1$ of all second intensity values of a second subset of the pixels of the overview image which are above the predetermined threshold.

3. The method according to claim 1, wherein the predetermined threshold is provided such that at least one of:
a sum is minimized, the sum being a sum of: (i) a first variance of all first intensity values of a first subset of the pixels of the overview image which are below the predetermined threshold, weighted with a number of such all first intensity values; and (ii) a second variance of all second intensity values of the second subset of the pixels of the overview image which are above the predetermined threshold, weighted with a number of intensity values, or
an interclass variance between such all first intensity values which are below the predetermined threshold and such all second intensity values which are above the predetermined threshold is maximized.

4. The method according to claim 1, wherein the predetermined threshold is set such that an agreement of at least one statistical moment of the binary image with a corresponding statistical moment of the overview image is maximized.

5. The method according to claim 1, further comprising selecting a microscopic bright field image of the area as the overview image.

6. The method according to claim 1, further comprising
obtaining a background estimate from the overview image by blurring with a strength which substantially removes the distributed objects, and
before converting the overview image into the binary image, replacing the overview image by a difference between the overview image and the background estimate.

7. The method according to claim 1, further comprising
obtaining a background estimate by recording a second overview image which is free of the distributed objects; and
before the conversion of the overview image into the binary image, dividing the overview image by the background estimate, pixel by pixel.

8. The method according to claim 1, further comprising, in the binary object mask, splitting at least one common boundary of adjacent ones of the distributed objects into a first boundary of a first one of the distributed objects and a second boundary of a second one of the distributed objects spaced therefrom using a watershed transformation.

9. The method according to claim 1, further comprising evaluating a center point of at least one of the distributed objects from the binary object mask.

10. The method according to claim 1, further comprising evaluating at least one Raman spectrum of the at least one of the distributed objects from the one or more responses to the irradiation.

11. The method according to claim 1, further comprising selecting biological cells distributed on a substrate as the distributed objects.

12. The method according to claim 1, wherein at least one of (i) the multivariate analysis includes the Principal Component Analysis (PCA), (ii) a classifier is evaluated from the multivariate analysis, the classifier mapping responding to the irradiation obtained on the biological cells on a further substrate to at least one value of a property applicable to the further substrate, or (iii) spectra of pure components are fitted to measured spectra using least squares fitting.

13. The method according to claim 12, wherein the classifier is evaluated by using at least one of Linear Discriminant Analysis (LDA) or Support Vector Machine (SVM).

14. The method according to claim 1, wherein biological cells, which are considered as the distributed objects and provided on a plurality of substrates, are irradiated with the light beam, and wherein the responses of the individual biological cells to the irradiation are merged across the substrates.

15. The method according to claim 14, wherein, based a totality of the one or more responses, a multivariate analysis is used to evaluate which properties of the biological cells change from one substrate to another substrate in a statistically significant manner.

16. A method for examining a plurality of distributed objects using an overview image of an area in which the distributed objects are distributed, comprising:
- converting the overview image into a binary image by classifying intensity values of pixels of the overview image as to whether they are below or above a predetermined threshold;
- cleaning the binary image of structures which are smaller than the distributed objects to generate a cleaned-up image;
- morphologically closing the cleaned-up image to form a binary object mask indicating which locations of the area belong to the distributed objects and which locations of the area belong to no object;
- irradiating at least one location in the area at which, according to the binary object mask, at least one of the distributed objects is located, the at least one location being irradiated with a light beam;
- evaluating one or more responses of the at least one of the distributed objects to the irradiation; and
- scanning the light beam relative to the at least one of the distributed objects based on the binary object mask, wherein a timing program of the scanning taking into account a spatial intensity distribution of the light beam is selected such that the spatial intensity distribution of a total received light dose is homogenized over the at least one of the distributed objects.

17. A method for examining a plurality of distributed objects using an overview image of an area in which the distributed objects are distributed, comprising:
- converting the overview image into a binary image by classifying intensity values of pixels of the overview image as to whether they are below or above a predetermined threshold;
- cleaning the binary image of structures which are smaller than the distributed objects to generate a cleaned-up image;
- morphologically closing the cleaned-up image to form a binary object mask indicating which locations of the area belong to the distributed objects and which locations of the area belong to no object;
- irradiating at least one location in the area at which, according to the binary object mask, at least one of the distributed objects is located, the at least one location being irradiated with a light beam; and
- evaluating one or more responses of the at least one of the distributed objects to the irradiation,
- wherein biological cells, which are considered as the distributed objects and provided on a plurality of substrates, are irradiated with the light beam, and wherein the responses of the individual biological cells to the irradiation are merged across the substrates,
- wherein, based a totality of the one or more responses, a multivariate analysis is used to evaluate which properties of the biological cells change from one substrate to another substrate in a statistically significant manner, and
- wherein at least one of (i) the multivariate analysis includes the Principal Component Analysis (PCA), (ii) a classifier is evaluated from the multivariate analysis, the classifier mapping responding to the irradiation obtained on the biological cells on a further substrate to at least one value of a property applicable to this substrate, or (iii) spectra of pure components are fitted to measured spectra using least squares fitting.

18. The method according to claim 17, wherein the classifier is evaluated by using at least one of Linear Discriminant Analysis (LDA) or Support Vector Machine (SVM).

19. A non-transitory computer-accessible medium which includes a machine readable program with instructions, wherein, when the program is executed on a computer, the computer is configured to execute procedures comprising:
- converting the overview image into a binary image by classifying intensity values of pixels of the overview image as to whether they are below or above a predetermined threshold;
- cleaning the binary image of structures which are smaller than the distributed objects to generate a cleaned-up image;
- morphologically closing the cleaned-up image to form a binary object mask indicating which locations of the area belong to the distributed objects and which locations of the area belong to no object;
- causing an irradiation of at least one location in the area at which, according to the binary object mask, at least one of the distributed objects is located, the at least one location being irradiated with a light beam; and
- evaluating one or more responses of the at least one of the distributed objects to the irradiation,
- wherein biological cells, which are considered as the distributed objects and provided on a plurality of substrates, are irradiated with the light beam, and wherein the responses of the individual biological cells to the irradiation are merged across the substrates, wherein, based a totality of the one or more responses, a multivariate analysis is used to evaluate which properties of the biological cells change from one substrate to another substrate in a statistically significant manner, and wherein at least one of (i) the multivariate analysis includes the Principal Component Analysis (PCA), (ii) a classifier is evaluated from the multivariate analysis, the classifier mapping responding to the irradiation obtained on the biological cells on a further substrate to at least one value of a property applicable to this substrate, or (iii) spectra of pure components are fitted to measured spectra using least squares fitting.

* * * * *